April 30, 1935.   P. R. ZINSER   1,999,796
METHOD OF MANUFACTURE OF THERMOPLASTIC SHEET CONSTRUCTIONS
Filed Sept. 23, 1930   2 Sheets-Sheet 1
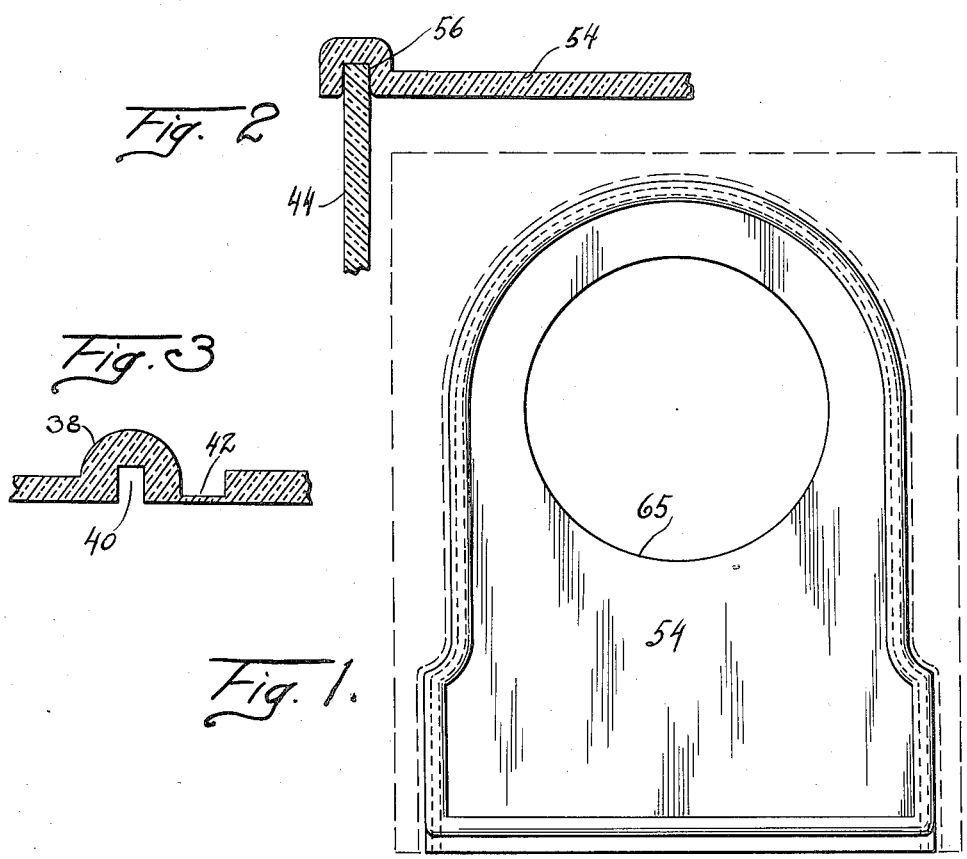
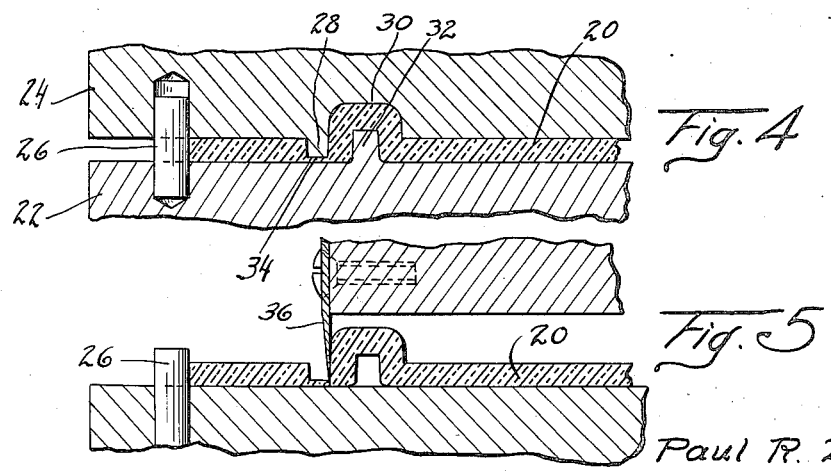
INVENTOR.
Paul R. Zinser
BY Parker & Burton
ATTORNEYS

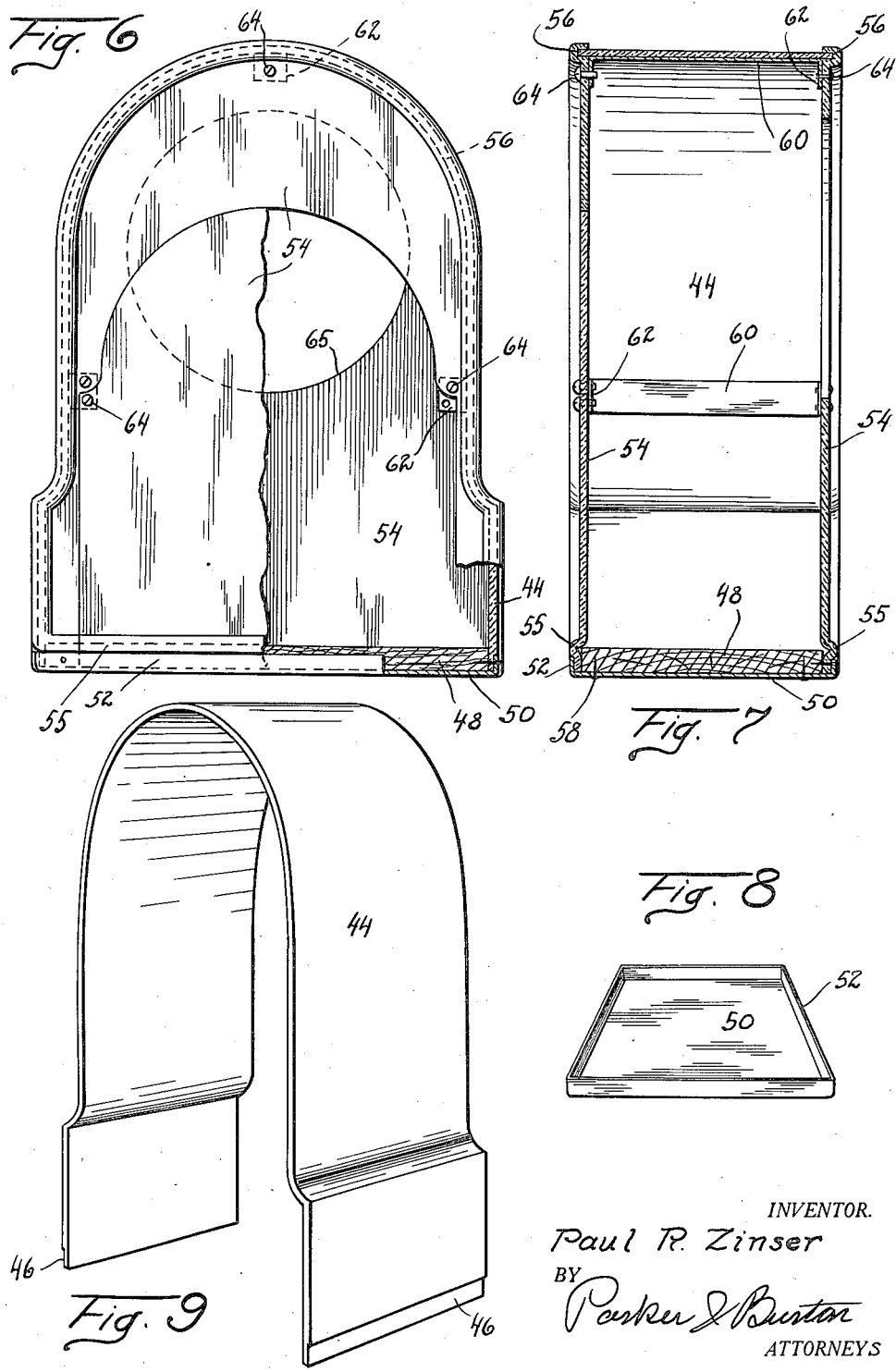

Patented Apr. 30, 1935

1,999,796

UNITED STATES PATENT OFFICE 1,999,796

METHOD OF MANUFACTURE OF THERMO-PLASTIC SHEET CONSTRUCTIONS

Paul R. Zinser, Detroit, Mich., assignor to Woodall Industries Incorporated, Detroit, Mich., a corporation of Michigan Application September 23, 1930, Serial No. 483,962

10 Claims. (Cl. 18—55)

My invention relates to improvements in box-like container structures formed of composition fibrous thermo-plastic sheet or board material and to an improved method of manufacturing such structures. The invention also relates to improvements in the method of treating thermo-plastic sheet material to form panels suitable to be used in a fabrication of containers of the type specified.

An object is to provide an improved container fabricated from thermo-plastic sheet or board material and of simple, sturdy, inexpensive construction and attractive appearance and to provide an improved method of treating the thermo-plastic sheet or board material to form such a container and as an intermediate step in the manufacture of the container to provide an improved panel or the like formed of such sheet or board material.

Another object consists in the manufacture of the panel or similar structure from sheet or board material of the character described having a rabbet or groove extending adjacent to a margin thereof and so formed that the outer wall of the rabbet is of strong and sturdy construction and capable of serving without other reinforcement the purpose for which it is intended.

Another object consists in improvements in the method of forming such a rabbet in such a panel so that the outer side wall of the rabbet though relatively thin, possesses substantial strength.

Another object consists in forming a panel of this kind of the material specified in such a way that a marginal rabbet will be formed therein on one side by displacement of the material without removal thereof and also in such manner that the marginal waste of material may be readily trimmed from the complete panel without damaging the formed rabbet.

Other objects and advantages and meritorious features of my invention will more fully appear from the following description, appended claims and accompanying drawings wherein:

Fig. 1 is an elevation of a panel structure embodying my invention.

Fig. 2 is a fragmentary section of a panel structure embodying the rabbet of my invention in conjunction with a second panel received in said rabbet.

Fig. 3 is a fragmentary sectional view through the rabbeted portion of a panel embodying my invention and of modified form.

Fig. 4 is a fragmentary sectional view through the die mechanism engaging a panel in carrying out my improved process.

Fig. 5 is a fragmentary sectional view of the panel shown in Fig. 4 being subjected to a trimming operation.

Fig. 6 is a rear elevation of a container structure embodying my invention and panels embodying the same.

Fig. 7 is a vertical sectional view through the structure shown in Fig. 6.

Fig. 8 is a perspective of a metal base plate used in the structure shown in Fig. 6.

Fig. 9 is a perspective of one of the panels used in the construction shown in Fig. 6.

The container here illustrated as embodying the invention is a clock case of artistic design, and specifically it is a housing or casing for a radio clock though the described improvements are applicable to containers of other types used for other purposes.

The thermo-plastic material here described and shown is what is commonly known to the trade as "K—B" board. This product is a composition cellulose fiber board material which carries a composition asphalt, the exact character and quantity of which vary.

Board or sheet material of this type is what I term thermo-plastic, that is in response to predetermined heat and pressure it assumes various shapes and forms and retains such assumed shape or form after cooling. It possesses substantial strength as a self-supporting structure and it is substantially waterproof and relatively inexpensive. Composition cellulose fibrous board or sheet material formed with binders other than that used in the so called "K—B" board might well prove satisfactorily responsive for my improved process. Synthetic rosins or other materials of the same general character might be used and it is my desire to claim the invention as applying broadly to suitable thermo-plastic material regardless of its precise composition.

Thermo-plastic sheet material of this character comes commercially in sheet or board form in thicknesses as desired. When subjected to a certain heat, as a predetermined steam heat, it may be shaped and formed in a suitable die and following a determined treatment it will retain such shape and form. In other words, panels of definite shape and form may be fabricated therefrom under heat and pressure. I provide certain of these panels with rabbets or grooves to receive the edges of other panels to securely fasten the same together to form the container.

My invention includes the process step of forming the rabbet or groove in the manner defined. It has been found that a suitable rabbet having the required shape and form and having a strong and sturdy side wall may be formed closely adjacent and parallel to a margin of the panel through employing the following process.

The rabbet is formed upon a press through the use of cooperating male and female die members. In order that the rabbet may satisfactorily serve its purpose it is desirable that it be rectangular in cross section, be of substantial depth, present square corners, and that the side wall possess full thickness and strength and particularly that the outer side wall be of such a character. It is necessary that the panel structure adjacent the rabbet be free from imperfections such as breakage or rupture.

I have discovered that if at the time the rabbet is being formed the opposite side of the panel be debossed closely adjacent and parallel to the outer wall line of the rabbet that the portion of the material displaced in this debossing operation will be forced inwardly and compacted to form the outer side wall of the rabbet, which will be of full thickness and highly compressed and will possess the required strength.

Any tendency to rupture as a result of the internal stresses on the material set up in the forming of the rabbet will be cared for by the flowing of the material away from the debossed groove. By virtue of the thermo-plastic character of the material this flowing will extend substantially throughout the rabbeted portion and the entire rabbeted portion will be strengthened and reinforced as a result of such debossing.

In Figs. 3 and 4 a relative arrangement of this rabbet and debossing groove is shown. The panel structure is indicated as 20. It is shown in Fig. 4 with the combination of the die forming operation between the lower die member 22 and the upper die member 24. Locating pins 26 are shown as retaining the blank in place. The upper die member is shown as provided with a male die portion 28 which forms the debossed groove and a female die portion 30 which receives the male die portion 32 of the lower die portion to form the rabbet.

Due to the substantial content of asphalt or other similar binding material carried in the board and its resulting thermo-plastic character, during the debossing of the groove on the side opposite the rabbet the material is displaced in both directions away from the line of the groove and the rabbeted portion is reinforced by such displaced material and given full thickness and considerable strength.

It will also be noted that the debossing is carried out to the extent of forming a groove of relatively great depth so that the bottom 34 of the groove is relatively thin, though due to the displacement of the material away from the line of the groove it is not unduly compressed. It will be noted that the panel may be trimmed by cutting the same through the bottom of the groove, as shown in Fig. 5, with a thin steel knife 36 as there illustrated. The cutting operation there shown is accomplished with a knife of this character because of the comparatively small amount of material necessary to be cut. Not only would it be virtually impossible to employ a knife of this kind to cut through the entire thickness of the panel were it not first debossed, but if the debossing operation were not first performed and a large and heavy knife were used to trim the panel at the same point it would be found that the action would be very unsatisfactory and that the rabbeted structure would be weakened thereby.

In Fig. 3 I have shown a panel having a curved bead 38 formed on one side and a rabbet 40 formed on the opposite side in the bead portion itself. This structure is not shown between the die members but it will be understood that the groove 42 is the debossed groove which corresponds to the debossed groove shown in Fig. 4 and which lies adjacent to but outside of the line of the rabbet. In this forming operation the material displaced in the forming of the debossed groove is displaced away from the groove line and the bead, though having a greater thickness than the panel blank, is built up by the material flowing thereinto during the debossing operation. The outer wall of the bead which serves as the outer wall of the rabbet is reinforced and strengthened at the same time, and the result generally is outlined in conjunction with the description of the construction shown in Figs. 4 and 5.

In Fig. 1 a panel structure such as forms one of the sides of the container illustrated in Figs. 6 and 7 is shown with a dotted line indicating the size of the blank. The dotted line also indicates the material which is removed in the trimming operation. It is apparent that in the debossing of the groove alongside the rabbet that the outer surface of the rabbet wall is subjected to a positive pressure which will also give the same a finished appearance.

In Fig. 2 a panel having a rabbet of the kind shown is illustrated as receiving the edge of another panel and it is to be noted that the rabbet is substantially rectangular in cross section so that the engagement with the edge of the cooperating panel is close and secure.

In Figs. 6-9, inclusive, I have illustrated one type of container employing panel structures of the character described and embodying my invention. This container is one used as a casing or housing for a radio clock and is fabricated as follows.

I provide a curved side wall member 44 formed of thermo-plastic sheet material of the character herein described which has a depressed marginal end 46. A base member 48, here shown as of wood, is provided and a sheet metal base plate 50 is also used. The base plate 50 has an upstanding marginal flange 52. Two panel elements 54 of the character shown in Figs. 1, 6 and 7, are provided. One of these panel elements serves as a front panel and the other panel element serves as a rear panel. Each panel element is formed of the thermo-plastic sheet material here described and has a marginal rabbet such as shown in the first five figures of the drawing built therein.

The lower ends of the curved member 44 rest between the base element 48 and the flange 52 of the metal base plate 50, as shown in Fig. 6, where the flange 52 seats in the recess formed at the lower margin of the curved member 44. The panels 54 are formed adjacent their lower edges to provide beads 55 which seat against the flange 52 of the metal base plate 50. The curved side wall 44 is positioned between the two panels 54 and its edges are received within the rabbets as at 56. This method of fabrication assures easy and ready assembly of the structure.

Suitable securing means such as nails, screws, or the like, here indicated as 58, may be used to secure the metal plate 50 in place as shown in Fig. 7. Reinforced transverse metal strips 60 are provided, secured, as indicated, at spaced apart intervals, to curve member 44. They have turned over ends 62 secured to the front and rear panels 54 by screws or the like 64 to secure the structure together.

The structure here shown is one designed for use as a radio clock cabinet. It will be seen that the front panel element has an opening 65 to receive a clock face and the rear panel element is cut away to permit of the insertion within the cabinet of a radio clock frame. It is understood, of course, that the opening formed in the rear panel may be closed by a panel section of the proper shape inserted therein.

What I claim is:

1. That method of forming a panel from thermo-plastic fibrous sheet material and providing a marginal rabbet therein which consists in forming a blank from said material over size the panel, subjecting said blank to pressure on one side along a line spaced from the margin to form an offset rabbet and supporting the sheet on the side opposite the rabbet forming pressure and simultaneously subjecting the blank to pressure on said opposite side along a line spaced slightly from and parallel to said rabbet line while supporting the sheet on the side opposite said pressure to form a groove therein, and trimming the marginal wastage from the blank to form a panel by cutting the same through the bottom of said groove alongside the outer wall of the rabbet.

2. That method of treating fibrous thermoplastic sheet material to form a panel therefrom having a marginal bead on one side and a rabbet on the opposite side comprising subjecting the sheet to pressure to form an offset rabbet and thereby simultaneously forming by displacement the desired bead, and simultaneously subjecting the sheet adjacent the marginal side of said rabbet and bead to a greater pressure to cause material in this portion of the sheet to flow toward said rabbet and bead to increase the thickness of the sheet thereabout.

3. The method of treating fibrous thermoplastic sheet material to form a panel therefrom including the step of subjecting said sheet to pressure to form a rabbet of substantially the same thickness as the sheet offset from the plane thereof, and forming a groove within said sheet closely adjacent said rabbet extending thereinto from the side of the sheet on which the rabbet is offset.

4. The method of treating a thermo-plastic sheet of material which includes the steps of forming a rabbet therefrom offset from the plane of the sheet and providing a groove within said sheet opening on the side of the offset, one wall of said groove being an exterior wall of said rabbet.

5. The method of treating a thermo-plastic sheet of material which includes the steps of forming a rabbet therefrom offset from the plane of the sheet, the thickness of the material of the rabbet being not less than the normal thickness of the material of the sheet, and providing a groove within said sheet adjacent to the rabbet and opening into the sheet on the side opposite to the opening of the rabbet thereinto, the thickness of the material at the bottom of the groove being substantially less than the normal thickness of the sheet.

6. The method of treating fibrous thermo-plastic sheet material to form a panel therefrom including the step of subjecting said sheet to pressure to form a rabbet therein and forming a groove in the sheet opening thereinto from the side of the sheet opposite the opening of the rabbet into the sheet, the thickness of the material constituting the rabbet being substantially equal to the normal thickness of the sheet and the thickness of the material at the bottom of the groove being substantially less than the normal thickness of the material of the sheet, and cutting the panel to size by cutting through the bottom of the groove alongside the outer wall of the rabbet.

7. That method of treating fibrous thermoplastic sheet material to form therefrom a panel having a marginal rabbet comprising subjecting the material to pressure on one side while supporting the same on the opposite side forming an offset rabbet therein spaced from the margin of the sheet, and forming a groove in the sheet alongside the rabbet and between the rabbet and the margin of the sheet and opening into the sheet on the side opposite the opening of the rabbet thereinto.

8. That method of treating fibrous thermoplastic sheet material to form therefrom a panel having a marginal rabbet comprising forming an offset rabbet therein spaced from the margin of the sheet, forming a groove in the sheet alongside the rabbet adjacent to the margin and opening into the sheet on the side opposite the opening of the rabbet therein, the material forming the rabbet having a thickness substantially equal to the normal thickness of the sheet and the material in the groove having a thickness substantially less than the normal thickness of the sheet.

9. The method of treating thermo-plastic sheet material to form a rabbet on one side thereof and a bead complementary to said rabbet on the other side thereof which consists in forming under pressure a rabbet on one side thereof and a bead opposite to said rabbet on the other side of said sheet, and simultaneously forming under pressure a groove within the sheet adjacent said bead having a bottom wall portion of substantially less thickness than the normal thickness of said sheet and causing material in the sheet displaced by the formation of the groove to flow into the bead increasing the thickness of the bead.

10. The method of forming a rabbet in thermoplastic sheet material having surrounding wall portions conforming substantially in thickness with the normal thickness of the sheet which consists in subjecting the sheet to pressure to form a rabbet on one side thereof and simultaneously compressing the sheet adjacent said rabbet to cause the material in the sheet to flow and build up the thickness of said sheet about said rabbet to a thickness substantially equal to the normal thickness of the sheet.

PAUL R. ZINSER.